(12) United States Patent
Bennett et al.

(10) Patent No.: US 9,926,019 B1
(45) Date of Patent: Mar. 27, 2018

(54) REAR FAIRING SYSTEM FOR A VEHICLE

(71) Applicant: UTILITY TRAILER MANUFACTURING COMPANY, City of Industry, CA (US)

(72) Inventors: Jeffrey J. Bennett, South Pasadena, CA (US); Robert James Dixon, Jr., Chino Hills, CA (US)

(73) Assignee: Utility Trailer Manufacturing Company, City of Industry, CA (US)

( * ) Notice: Subject to any disclaimer, the term of this patent is extended or adjusted under 35 U.S.C. 154(b) by 0 days.

(21) Appl. No.: 15/457,769

(22) Filed: Mar. 13, 2017

Related U.S. Application Data

(63) Continuation of application No. 15/230,268, filed on Aug. 5, 2016, now Pat. No. 9,637,184.

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC .. B62D 35/001; B62D 35/007; B62D 35/008; B62D 37/02
USPC .......................................... 296/180.1, 180.4
See application file for complete search history.

(56) References Cited

U.S. PATENT DOCUMENTS

| 3,999,797 | A | 12/1976 | Kirsch |
| 5,375,903 | A | 12/1994 | Lechner |
| 7,862,102 | B1 | 1/2011 | Benton |
| 8,360,507 | B2 | 1/2013 | Benton |
| 8,684,447 | B2 | 4/2014 | Henderson |
| 8,851,554 | B2 | 10/2014 | Wayburn et al. |
| 9,457,847 | B2 | 10/2016 | Smith |
| 2012/0025565 | A1 | 2/2012 | Nusbaum |
| 2014/0339854 | A1 | 11/2014 | Tuerk |
| 2015/0008701 | A1 | 1/2015 | Ryan |
| 2015/0197292 | A1 | 7/2015 | Smith |

OTHER PUBLICATIONS

STEMCO Truck TrailerTail® Fuel Savings Technology (4 pgs.).

*Primary Examiner* — Jason S Daniels
(74) *Attorney, Agent, or Firm* — Karish & Bjorgum, PC

(57) ABSTRACT

A rear fairing system for a vehicle includes a roof foil on top of the vehicle roof and sidewall foils pivotally mounted to the vehicle sidewalls. The roof foil includes downwardly facing concavity and a roof foil curved convex upper surface extending laterally across the vehicle roof. A spring extends laterally across the vehicle roof in the downwardly facing concavity. A door foil extends aft of the roof foil with a curved convex upper surface continuing the roof foil curved convex upper surface. Cables extend from the vehicle rear doors to the sidewall foils adjacent the sidewall foil free edges. The cables are taut and strain the sidewall foils toward the vehicle rear doors with the vehicle rear doors closed.

23 Claims, 4 Drawing Sheets

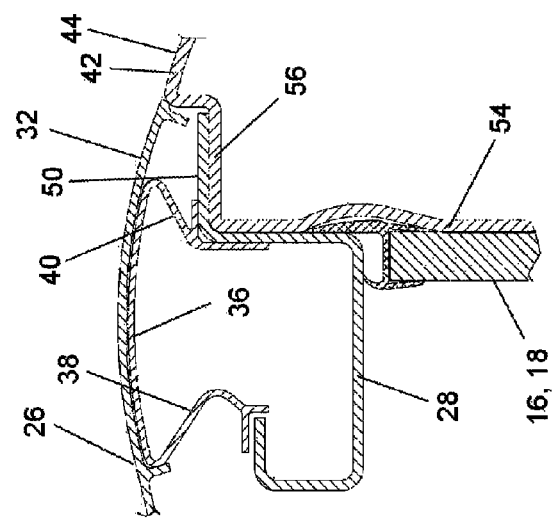
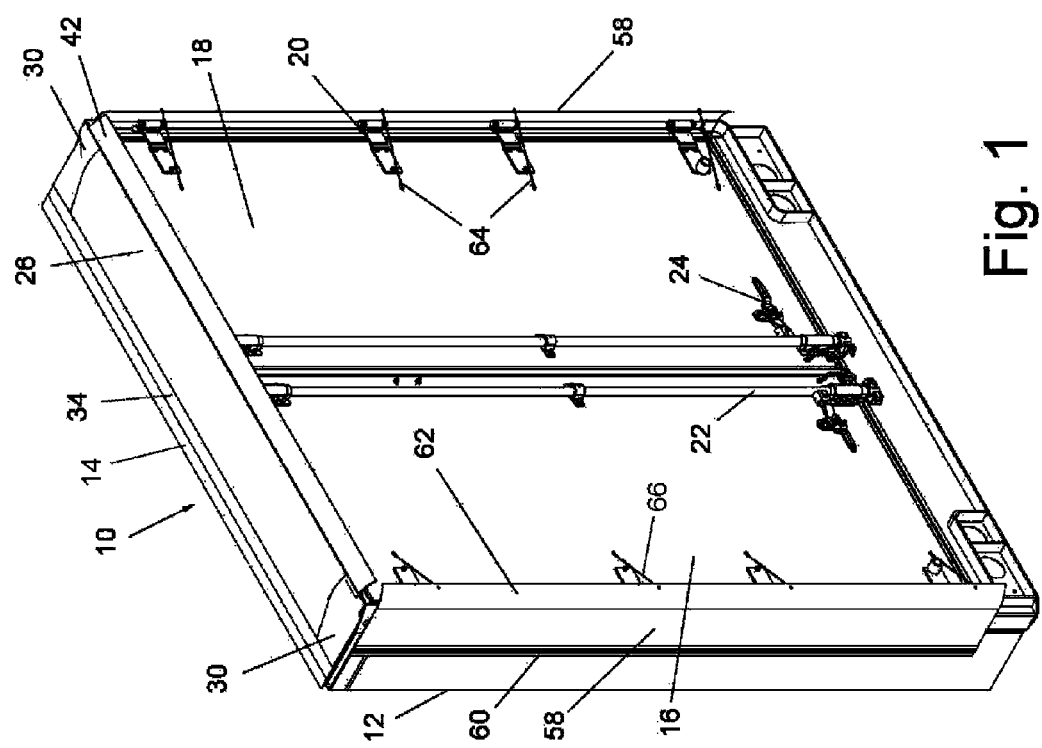

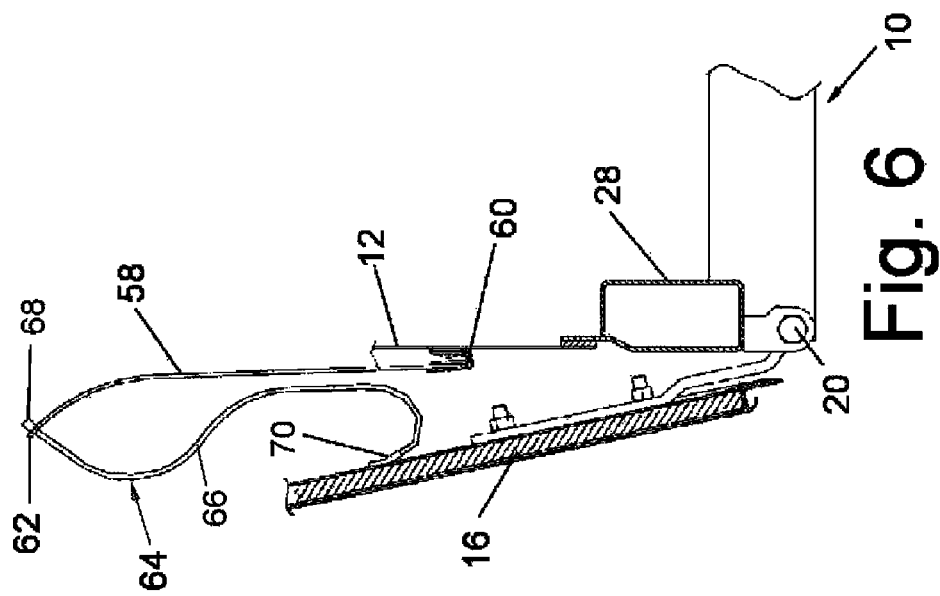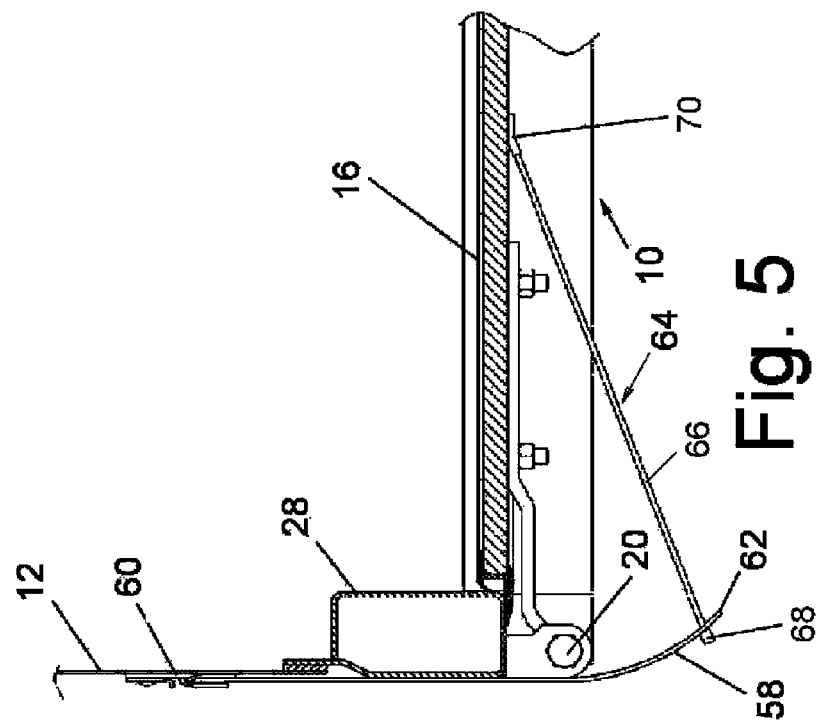

REAR FAIRING SYSTEM FOR A VEHICLE

REFERENCE TO RELATED APPLICATIONS

This is a continuation of U.S. patent application Ser. No. 15/230,268, filed Aug. 5, 2016.

BACKGROUND OF THE INVENTION

The field of the present invention is aerodynamic systems for vehicles.

Aerodynamic devices have long been employed on vehicles to enhance overall vehicle efficiency by reducing wind resistance, or drag. One such system applicable to cargo vehicles is illustrated in U.S. Pat. No. 8,191,956. Such devices are now commonly seen on truck cabs to smoothly divert impinging air around a semi-trailer truck. Side skirts of the type disclosed in the aforementioned patent are also now commonly seen on larger vehicles. Known, but less commonly employed, are such systems designed to address the reduced pressure behind a moving vehicle.

In spite of such devices having been commonly employed and encouraged by governmental mandate, the employment of such devices remains problematic. Of particular interest are rear fairings. It has been found that significant efficiency can be achieved by reasonably short fairings. Even so, such fairings are inconvenient in that they can be in the way when accessing loads through rear cargo doors and can be vulnerable to damage when backing to a dock or the like. Both side fairings and roof fairings at the rear of a vehicle can be subject to such issues.

SUMMARY OF THE INVENTION

The present invention is directed to rear fairings for conveyance vehicles having a rear opening door or doors.

In the present invention, sidewall foils are vertically hinged to the vehicle sidewalls forward of associated door hinges. Tension linkages extend from the vehicle doors to the sidewall foils adjacent the free edges of the foils. With the vehicle doors closed, the tension linkages are taut and strain the sidewall foils toward the vehicle rear doors. When opened, the tension linkages become slack and allow the sidewall foils to not interfere with the door opening. The forward location of the attachment to the vehicle can facilitate door opening and add foil resilience.

The foregoing arrangements and displaced mountings allow for the sidewall fairings and door fairings to be elastically deformable to a point that they will both provide proper fairing performance and compress against the vehicle without damage when the vehicle is backed into a solid surface. The curvature of these foils provides effective drag reduction without excessive extension aft of the vehicle.

Accordingly, it is an object of the present invention to provide an improved rear fairing system for improved vehicle efficiency. Other and further objects and advantages will appear hereinafter.

BRIEF DESCRIPTION OF THE DRAWINGS

FIG. 1 is a perspective view of the back of a vehicle with a fairing system including sidewall foils and top foils;

FIG. 4 is a cross-sectional detail side view of an alternative spring associate with the first embodiment.

FIG. 5 is a cross-sectional plan view of a sidewall foil.

FIG. 6 is a cross-sectional plan view of the sidewall foil of FIG. 5 with the vehicle rear door fully open.

DETAILED DESCRIPTION OF THE PREFERRED EMBODIMENT

Figure 2:
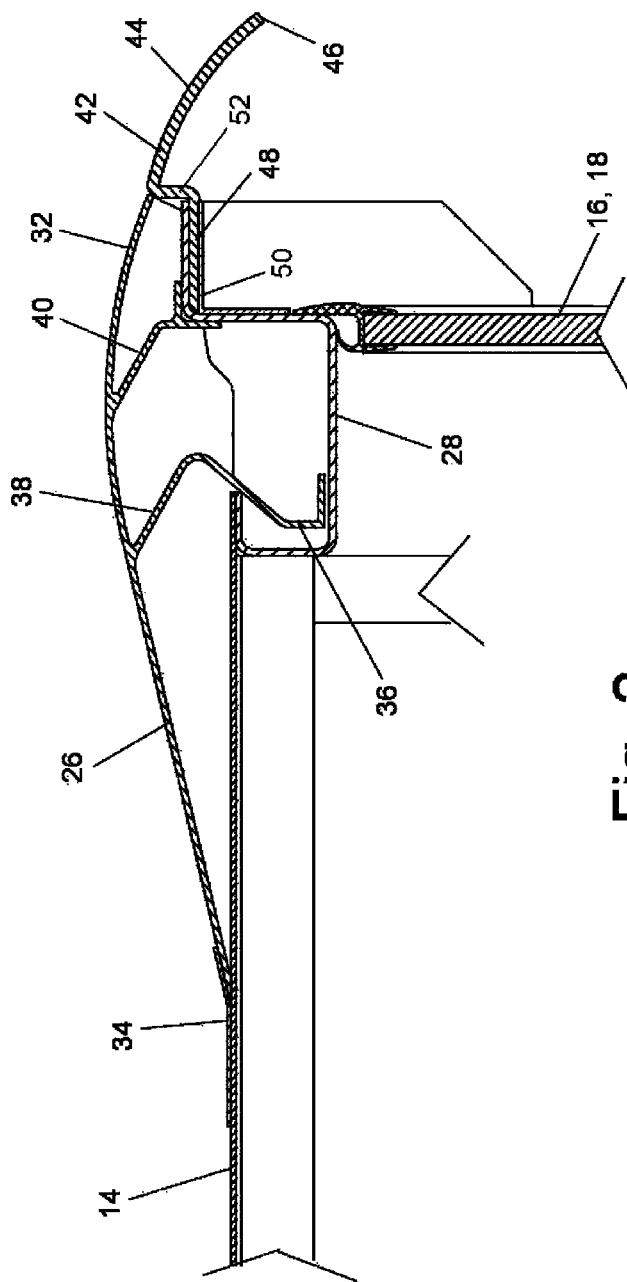
FIG. 2 is a cross-sectional side view of a first embodiment of a roof foil and door foil.

Turning to the drawings in detail, FIG. 1 illustrates the back end of a conveyance vehicle which may be a truck, semi-trailer, trailer or other cargo vehicle 10. Such devices typically include vertical sidewalls 12, a horizontal roof 14 extending between the vertical sidewalls 12 and rear doors 16, 18. The rear doors 16, 18 are hinged about vertical pivot axes typically defined by a series of hinges 20 attached to the frame of the vehicle at the vehicle sidewalls 12. Typical latching mechanisms 22, 24 are also illustrated. A rear fairing system is illustrated to extend across the roof 14 and to extend down the vertical sidewalls 12.

Figure 3:
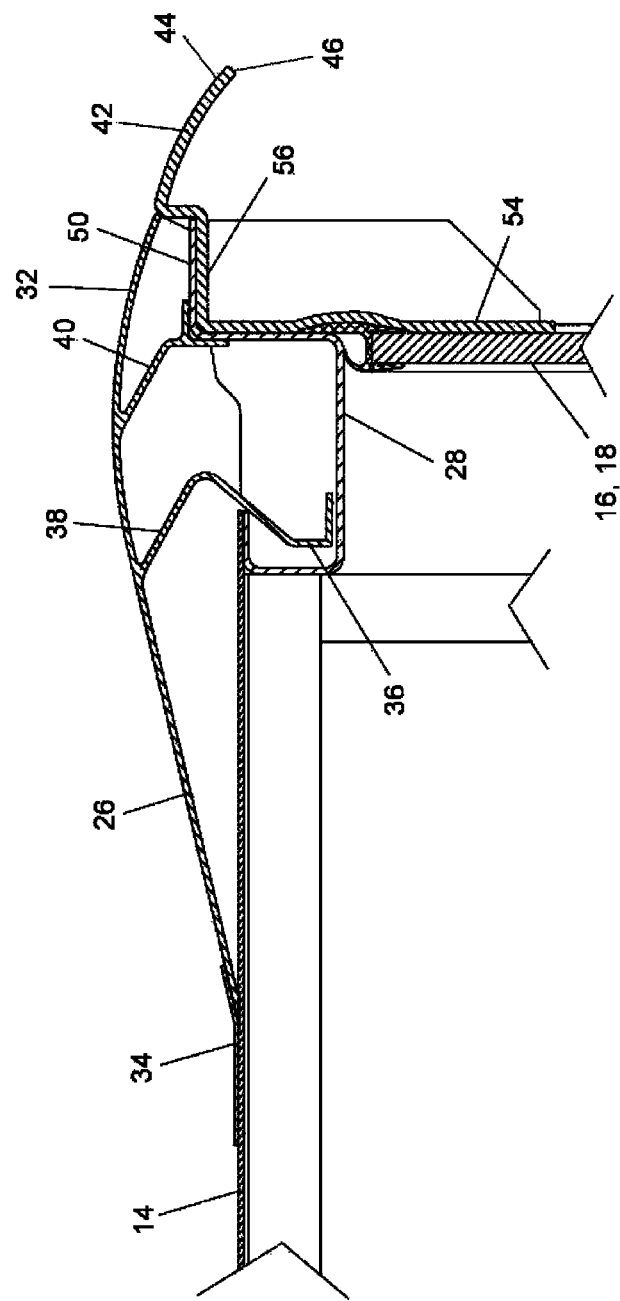
FIG. 3 is a cross-sectional side view of a second embodiment of a roof foil and door foil.

The fairing system includes a roof foil 26 on the vehicle roof 14. The roof foil 26 extends laterally across the roof 14 to the sidewalls 12. FIGS. 2 and 3 illustrate the same roof foil 26 in cross section. The roof foil 26 is associated with the top panel of the roof 14 and a horizontally extending vehicle frame 28 of the vehicle 10 which extends fully between the sidewalls 12. The roof foil 26, as well as the other foils discussed below, is principally a thermoplastic vulcanizate curved plate of fully cured EPDM rubber particles encapsulated in a polypropylene matrix. Such material exhibits flexibility and weather resistance.

The curvature of the plate defines a downwardly facing concavity on one side of the plate extending laterally across the vehicle. The ends of the plate are flattened by clamping strips 30 fastened to the vehicle frame adjacent the sidewalls 12. The top side of the curved plate defines a curved convex upper surface 32 extending laterally across the vehicle to the clamping strips 30. The roof foil 26 extends to a forward edge engaging the top of the roof 14 forward of the vehicle rear doors. The forward edge is sealed by tape 34. The arc defined by the roof foil 26 provides a transition for air flow over the trailing fairing assembly to create adequate door clearance for the fairing assembly. The clamping conveniently transitions roof airflow to avoid mixing with or disturbing the airflow along the sidewalls 12.

As the roof foil 26 extends upwardly above the vehicle roof 14 and is subject to possible impact with dock structures, an elongate spring 36 extends laterally across the vehicle roof between the vehicle roof 14 and the roof foil 26 in the defined downwardly facing concavity. The roof foil 26 in the preferred embodiment is sufficiently resilient to compress against the roof 14 without exceeding the yield point of the plate as is the spring 36. The spring 36 is preferably integrally formed with the plate of the roof foil 26 as an extrusion of resilient material able to deform elastically under downward movement of the roof foil 26 from outside forces. The spring 36 provides vertical resilient strain by angled support walls 38, 40 which can flex without responding by experiencing column failure. The spring 36 is positioned against the vehicle frame 28. Through adaptive spring design, the plate of the roof foil 26 and the spring 36 can be separately formed as seen in FIG. 4.

A door foil 42 is shown in both FIGS. 2 and 3 to extend aft of the roof foil 26. The door foil 42 also extends laterally across the vehicle and has an edge-abutting relationship with the trailing edge of the roof foil 26. The door foil 42 has a curved convex upper surface 44 extending from the roof foil 26 to a free edge 46 aft of the vehicle rear doors 16, 18. The surface 44 of the door foil 42 continues the curved convex upper surface of the roof foil 26 downwardly to the free edge 46 behind the back of the vehicle 10. A smooth continuous flow path therefore exists from the leading edge of the roof foil 26 to the free edge 46 of the door foil 42.

The mounting of the door foil 42 in FIGS. 2 and 3 illustrate a difference between embodiments. In FIG. 2, the door foil 42 is fixed to the vehicle frame 28 across the width of the vehicle 10. A mounting flange 48 extends from the door foil 42 below the vehicle frame 28. A spring steel angle bracket 50 extending across the vehicle 10 includes one leg fixed to the vehicle frame 28 by fasteners or the like and another leg fixed to the mounting flange 48 by bonding. The bracket 50 of spring steel is thin enough to resiliently deform if the door foil 42 is impacted. Further, there is a resilient plate section 52 between the door foil section and the mounting flange 48 which can also accommodate resilient bending under impact.

FIG. 3 illustrates an embodiment where the door foil 42 is fixed relative to the vehicle doors 16, 18 rather than to the vehicle 10 above the doors as shown in FIG. 2. With the door foil 42 fixed relative to the doors 16, 18, a break in the door foil is mandated to allow the doors 16, 18 to be opened. In this embodiment, a mounting flange 54 is bonded or otherwise affixed to the doors 16, 18.

A resilient plate section 56 between the door foil 42 and the area of juxtaposition of the mounting flange 54 with the vehicle doors 16, 18 is preferably not fixed to the vehicle doors 16, 18. Rather, the shape of this section 56 provides for its position laying against the doors 16, 18 when the doors 16, 18 are closed, placing the section 56 between the doors 16, 18 and the vehicle frame 28. Without the spring 50 of the other embodiment, the larger pate section 56 provides added impact resilience. When the doors 16, 18 are opened so far as to lie against the sidewalls 12, the door foil 42 clears the sidewall of the trailer.

In each of the embodiments of FIGS. 2 and 3, the door foil 42 is of an elastically deformable material as is the roof foil 26. With either of the mounting of the door foil 42, when the vehicle doors 16, 18 are closed, the door foil 42 is able to compress against the closed doors 16, 18 and avoid damage upon impact. When the vehicle doors 16, 18 are open, the door foil 42, when mounted to the vehicle 10 at the frame 28, can deform if the vehicle contacts the dock structure. With the door foil 42 mounted to the doors 16, 18 and they are open, the door foil 42 is out of any impact area.

The door foil curved convex upper surface 44 in either embodiment has a width approximating that of the vehicle 10. The extension length between the edge abutment and the door foil free edge 46 with downward curvature has been found to provide effective fairing efficiency without extending substantially beyond the vehicle. To put in the context of common semi-trailer trucks, the extension of the door foil 42 to the free edge is approximately five inches. The door foil 42 also curves inwardly of the vehicle by about two inches. This arrangement appears to enhance drag reduction with a minimum extension of the foil extension behind the vehicle.

A sidewall foil 58 is shown associated with each sidewall 12 of the vehicle 10. FIG. 5 illustrates one sidewall foil 58 arranged against one of the vehicle sidewalls 12. The sidewall foils 58 are mirror images of one another. A vertical hinge 60 is located at the forward end of each sidewall foil 58 to pivotally mount each of the foils 58 about a fairing pivot axis. The vertical hinges 60 of the preferred embodiment are shown to be living hinges. Mechanical hinges are also appropriately employed. A free edge 62 of each sidewall foil 58 is then located aft of the vehicle rear doors 16, 18.

The sidewall foils 58 are additionally attached to the vehicle 10 by tension linkages 64. The tension linkages 64 extend from the associated rear doors 16, 18 to the sidewall foils 58 at points adjacent to the free edges 62. The tension linkage 64 for each door 16, 18 is shown in the preferred embodiment to be four cables 66. The use of cables 66 is advantageous in that they are easily fabricated, reasonably indestructible and allow less critical placement of the anchor points on the rear doors 16, 18 than more mechanical linkages. The cables may be stiff enough to urge the sidewall foils 58 outwardly as the doors 16, 18 are opened yet have the ability to flex as seen in FIG. 6 for the doors 16, 18 to fully open. Other linkages are, of course, applicable. The number of elements forming each tension linkage 64 may vary depending on the makeup and flexibility of the associated sidewall foil 58 at its free edge 62. Brackets 68, 70 mount the ends of the cables 66.

With the vehicle doors 16, 18 open, any tension in the tension linkages 64 is released, allowing the sidewall foils 58 to pivot about the fairing pivot axes of the vertical hinges so as not to interfere with door opening. With the doors 16, 18 closed, the tension linkages 64 placed effectively at the free edges 62 strain the sidewall foils 58 into aerodynamically advantageous curved orientations as seen in FIG. 5. As with the door foil 42, the sidewall foils 58 are elastically deformable such that impact with a dock structure will not damage the sidewall foils 58.

In the preferred embodiment with the doors 16, 18 closed and the cables 66 taut, the extensions of the sidewall foils 58 to the free edges 62 are approximately five inches on semi-trailer trucks. The sidewall foils 62 also curve inwardly of the vehicle by about two inches. This arrangement again appears to enhance drag reduction with a minimum extension of the foil extension behind the vehicle. Additional cable length is accommodated by placement of the brackets 70 on the doors 16, 18 further from the vertical pivot axis. FIG. 6 illustrates a sidewall foil 58 with the vehicle rear door 16 fully open.

Thus, an improved fairing system has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A rear fairing for a vehicle having a vehicle sidewall and a vehicle rear door hinged to the vehicle about a vertical pivot axis, comprising
   a vertical hinge mounted to the vehicle sidewall forward on the vehicle from the vertical pivot axis and defining a fairing pivot axis;
   a sidewall foil including a free edge displaced from the fairing pivot axis, the sidewall foil being pivotally mounted to the vehicle sidewall by the vertical hinge such that the free edge can extend forwardly of the fairing pivot axis on the vehicle with rear door open and can extend rearwardly of the rear door with the rear door closed;
   a tension linkage extending from the vehicle rear door to the sidewall foil adjacent the free edge of the sidewall foil, the tension linkage being taut and straining the free edge of the sidewall foil inwardly of the vehicle sidewall with the vehicle rear door closed.

2. The rear fairing of claim 1, wherein the sidewall foil is constrained only by the vertical hinge, the tension linkage and the vehicle at a corner thereof between the vertical hinge and the free edge with the rear door closed.

3. The rear fairing of claim 2, wherein the sidewall foil is constrained only by the vertical hinge with the rear door open.

4. The rear fairing of claim 1, wherein the sidewall foil is elastically deformable to allow further elastic deformation of the free edge to against the vehicle rear door with the rear door closed.

5. The rear fairing of claim 1, wherein the tension linkage includes multiple cables.

6. The rear fairing of claim 1, wherein the sidewall foil has a vertical height approximating the height of the vehicle rear door, the sidewall foil extending aft of the vehicle rear doors by about five inches and extending inwardly of the vehicle sidewall by about two inches with the rear door closed.

7. A vehicle having vehicle sidewalls and vehicle rear doors hinged to the vehicle about vertical pivot axes, comprising
the rear fairing of claim 1;
a second rear fairing being a mirror image of the rear fairing of claim 1.

8. A rear fairing for a vehicle having a vehicle sidewall and a vehicle rear door hinged to the vehicle about a vertical pivot axis, comprising
a vertical hinge mounted to the vehicle sidewall forward on the vehicle from the vertical pivot axis and defining a fairing pivot axis;
a sidewall foil including a free edge displaced from the fairing pivot axis, the sidewall foil being pivotally mounted to the vehicle sidewall by the vertical hinge such that the free edge can extend forwardly of the fairing pivot axis on the vehicle with rear door open and can extend rearwardly of the rear door with the rear door closed;
a tension linkage extending from the vehicle rear door to the sidewall foil adjacent the free edge of the sidewall foil, wherein the sidewall foil is deformable from at least the vertical pivot axis to the free edge, the sidewall foil being under deformation inwardly of the vehicle sidewall from the vertical pivot axis to the free edge defining an aerodynamically advantageous curve with the door closed.

9. The rear fairing of claim 8, wherein the sidewall foil is constrained by the vertical hinge, the tension linkage and the vehicle at a corner thereof between the vertical hinge and the free edge with the rear door closed.

10. The rear fairing of claim 9, wherein the sidewall foil is constrained only by the vertical hinge with the rear door open.

11. The rear fairing of claim 8, wherein the sidewall foil is elastically deformable to allow further elastic deformation of the free edge to against the vehicle rear door with the rear door closed.

12. The rear fairing of claim 8, wherein the tension linkage includes multiple cables.

13. The rear fairing of claim 8, wherein the sidewall foil has a vertical height approximating the height of the vehicle rear door, the sidewall foil extending aft of the vehicle rear doors by about five inches and extending inwardly of the vehicle sidewall by about two inches with the rear door closed.

14. A vehicle having vehicle sidewalls and vehicle rear doors hinged to the vehicle about vertical pivot axes, comprising
the rear fairing of claim 8;
a second rear fairing being a mirror image of the rear fairing of claim 8.

15. A rear fairing for a vehicle having a vehicle sidewall and a vehicle rear door hinged to the vehicle about a vertical pivot axis, prepared by a process comprising the steps of
providing a vertical hinge mounted to the vehicle sidewall forward on the vehicle from the vertical pivot axis and defining a fairing pivot axis;
providing a sidewall foil including a free edge displaced from the fairing pivot axis, the sidewall foil being pivotally mounted to the vehicle sidewall by the vertical hinge such that the free edge can extend forwardly on the vehicle of the fairing pivot axis with rear door open and can extend rearwardly on the vehicle of the vertical pivot axis with the rear door closed, the sidewall foil being elastically deformable from at least the vertical pivot axis to the free edge;
providing a tension linkage extending from the vehicle rear door to the sidewall foil adjacent the free edge of the sidewall foil;
straining the deformable sidewall foil inwardly of the vehicle sidewall into an aerodynamically advantageous curve by closing the rear door.

16. The rear fairing of claim 15, wherein the step of providing the sidewall foil includes the sidewall foil being elastically deformable from the vertical hinge to the free edge and constrained by the vertical hinge, the tension linkage and the vehicle abutting against the sidewall foil at the vertical pivot axis with the rear door closed.

17. The rear fairing of claim 15, wherein the step of providing the sidewall foil includes the sidewall foil being further elastically deformable to allow elastic deformation of the free edge against the vehicle rear door with the rear door closed.

18. The rear fairing of claim 15, wherein the step of providing the tension linkage includes the tension linkage being multiple cables.

19. The rear fairing of claim 15, wherein the step of providing the sidewall foil includes the sidewall foil having a vertical height approximating the height of the vehicle rear door and an extension length between the vertical hinge and the free edge, the sidewall foil extending aft of the vehicle rear doors by about five inches with the rear door closed, the step of straining the free edge of the deformable sidewall foil inwardly of the vehicle sidewall being by about two inches with the rear door closed.

20. A vehicle having vehicle sidewalls and vehicle rear doors hinged to the vehicle about vertical pivot axes, comprising
the steps of preparing the rear fairing prepared by the process of claim 15;
preparing a second rear fairing as a mirror image of the rear fairing of claim 15.

21. A rear fairing for a vehicle having a vehicle sidewall and a vehicle rear door hinged to the vehicle about a vertical pivot axis, comprising
a vertical hinge mounted to the vehicle sidewall forwardly on the vehicle from the vertical pivot axis and defining a fairing pivot axis;
a sidewall foil including a free edge displaced from the fairing pivot axis, the sidewall foil being pivotally mounted to the vehicle sidewall by the vertical hinge such that the free edge can extend forwardly on the vehicle of the fairing pivot axis with rear door open and can extend rearwardly on the vehicle of the rear door with the rear door closed, the sidewall foil being elastically deformable to allow elastic deformation of the free edge against the vehicle rear door with the rear door closed;

a tension linkage extending from the vehicle rear door to the sidewall foil adjacent the free edge of the sidewall foil, the sidewall foil being held in elastic deformation inwardly of the vehicle sidewall from the vertical pivot axis to the free edge and defining an aerodynamically advantageous curve with the door closed by the tension linkage.

22. The rear fairing of claim 21, wherein the tension linkage includes multiple cables.

23. A vehicle having vehicle sidewalls and vehicle rear doors hinged to the vehicle about vertical pivot axes, comprising the rear fairing of claim 21;

a second rear fairing being a mirror image of the rear fairing of claim 21.

\* \* \* \* \*